United States Patent [19]

Berry

[11] Patent Number: 4,864,601
[45] Date of Patent: Sep. 5, 1989

[54] INTEGRATED VOICE DATA WORKSTATION

[76] Inventor: Wayne F. Berry, 1855 E. Ramon Rd., Palm Springs, Calif. 92662

[21] Appl. No.: 183,846

[22] Filed: Apr. 20, 1988

[51] Int. Cl.$^4$ ............................................. H04M 11/06
[52] U.S. Cl. ........................................ 379/96; 370/125
[58] Field of Search ............................. 379/96, 93, 90; 370/125

[56] References Cited

PUBLICATIONS

A New Generation of Information Terminals, Cermetek Microelectronics, 5 pages, Apr. 1987.
Marshall Display Products Catalog depicting a flat panel terminal.
Emerald Computers Brochure depicting the FT-50 flat panel terminal.
The Finlux Brochure depicting the Finlux MD512.256 Matrix Display.

*Primary Examiner*—Stafford D. Schreyer

[57] ABSTRACT

An integrated voice data workstation is disclosed comprising a light emitting flat panel display, processor unit, keyboard and telephone communication set which, through limited system architecture, mates the function of the processor unit with the dedicated telephone communication set without disruption of their individual normal processing and communication operation. The integrated voice data workstation is specifically constructed to house the processor unit in a compact computing platform configuration which cradles the telephone communication set while the light emitting flat panel display is mounted on an articulated support arm to dispose the light emitting flat panel display off a support surface or desk, and thereby minimize desk footprint of the workstation. Concurrent non-disruptive processing and communication operation is achieved by use of a co-processor which bypasses the operating system of the processor unit to establish direct communication between the telephone communication set and the processor unit and thereby allow the processor unit to operate at peak level efficiencies without degradation to other program tasks.

22 Claims, 3 Drawing Sheets

| HARDWARE<br>INTERRUPT<br>REQUEST LINE | PRIORITY<br>0 = HIGHEST<br>23 = LOWEST | HARDWARE<br>ASSIGNMENT | 82380<br>PRIORITY<br>RE-ASSIGNMENT |
|---|---|---|---|
| (ALL 8 BIT BUS IBM PC TYPE COMPUTERS) | | | |
| NMI | 0 | NON-MASKABLE INTERRUPT | 0 |
| IRQ 0 | 1 | TIMER OUTPUT | 9 |
| IRQ 1 | 2 | KEYBOARD | 10 |
| IRQ 2 | 3 | CASCADE FOR IRQ 8-15 | 11 |
| IRQ 3 | 4 | SERIAL PORT 2 | 12 |
| IRQ 4 | 5 | SERIAL PORT 1 | 13 |
| IRQ 5 | 6 | PARALLEL PORT 2 | 14 |
| IRQ 6 | 7 | DISK CONTROL | 15 |
| IRQ 7 | 8 | PARALLEL PORT 1 | 16 |
| (ALL 16 BIT BUS IBM PC TYPE COMPUTERS) | | | |
| IRQ 8 | 9 | REAL TIME CLOCK | 17 |
| IRQ 9 | 10 | REDIRECTED TO IRQ 2 | 18 |
| RIQ 10 | 11 | CASCADE FOR IRQ 16-23 | 19 |
| IRQ 11 | 12 | RESERVED | 20 |
| IRQ 12 | 13 | MOUSE | 21 |
| IRQ 13 | 14 | COPROCESSOR | 22 |
| IRQ 14 | 15 | HARD DISK CONTROLLER | 23 |
| IRQ 15 | 16 | RESERVED | 24 |
| (ADDITIONAL 82380 COPROCESSOR IRQ LINES) | | | |
| IRQ 16 | 17 | PHONE LINE #1 (MODEM) | 1 |
| IRQ 17 | 18 | PHONE LINE #2 (MODEM) | 2 |
| IRQ 18 | 19 | ISDN IRQ | 3 |
| IRQ 19 | 20 | 3270 IRQ | 4 |
| IRQ 20 | 21 | 5250 IRQ | 5 |
| IRQ 21 | 22 | FAX IRQ | 6 |
| IRQ 22 | 23 | PC NETWORK IRQ | 7 |
| IRQ 23 | 24 | DIGITAL PBX (COM3) IRQ | 8 |

FIGURE 4

INTEGRATED VOICE DATA WORKSTATION

BACKGROUND OF THE PRESENT INVENTION

The present invention relates generally to data processing and communication systems, and more particularly to an integrated voice data workstation comprising a light emitting flat panel display, processor unit, keyboard and telephone communication set which, through specific system architecture, mates the function of the processor unit with dedicated telephone communication without disruption of normal processing and communication operation.

Since initial introduction in the mid-1960s, the video display terminal has become the primary user interface between a computer operator and a computer with estimates placing the installed base of display terminals in the United States at approximately seven million units. As technology has advanced from the 1960s, video display terminals have spawned intelligent units with local processing power which have resulted in the modern microcomputers and personal computers currently utilized in industry.

Although such microcomputers and personal computers have proven a substantial improvement and have achieved widespread acceptance in the industry as a method of enabling the rapid dissemination of information to users, they have heretofore failed to provide concurrent voice and data communication. Since voice is the most common method through which individuals communicate and since a great deal of today's business is accomplished over the telephone, the integration of voice and data communication comprises a long-felt need in the art.

In recognition of this long-felt need, a new subsection of technology has recently emerged in the industry known generically as integrated voice data workstations. Basically, such integrated voice data workstations comprise devices that combine an alphanumeric display and keyboard with a telephone station set. The intent of such integrated voice data workstations is to combine voice and data capabilities through the addition of a conventional telephone handset and phone features to a display terminal or personal computer. Examples of such prior art integrated voice data workstations are the Personal Terminal 510 manufactured by AT&T; the Cypress System manufactured by IBM/Rolm Corporation; the Display Phone 220 manufactured by Northern Telecom; and the Series 1900, 4900, and 5900 manufactured by Davox Corporation.

Most of such prior art integrated voice data terminals or workstations have comprised stand alone devices equipped with a telephone handset, keyboard, display, magnetic storage medium, and a microprocessor. Further, most of such prior art integrated voice data terminals have provided basic telephone features, such as a directory that stores frequently used numbers along with the name and address data for automatic dialing, last number readout, call hold and call forwarding capabilities, multiple line connection for voice and data transmission, hands-free dialing, and a speaker phone. In addition, such prior art terminals have generally been equipped to handle at least two telephone lines: one for data transmission, and one for voice transmission. Although such prior art integrated voice data terminals have provided a mechanism for integration of voice and data communication which have been superior to that previously associated with conventional personal computer/modem systems, they have generally experienced substantial deficiencies which have prevented their widespread acceptance in the industry.

Foremost of these deficiencies has been the extremely high cost of such integrated voice data workstations as well as their general failure to be readily compatible with existing personal computers, personal computer networks, and mainframe and mini-computers. In addition, such prior art terminals, although providing integration of voice and data, have typically been severely limited in processing capability. As such, it typically has not made sound financial and/or business sense to relinquish a minicomputer or personal computer for a more limited prior art integrated voice data terminal, especially when a telephone modem could give the personal computer some of the more important features of the voice data functionality found in an integrated voice data terminal.

In addition, such prior art integrated voice data terminals have typically included extremely small CRTs, non-standard keyboards, relatively small amounts of internal memory, no industry standard bus compatability, relatively few incoming telephone lines, telephone line and PBX capability problems, and proprietary operating systems which have further detracted from their widespread acceptance in industry. Further, such prior art devices have typically required use of protocol converters and/or proprietary controllers for mainframe or mini-computer connectivity.

Separate and apart from the above-referenced technical deficiencies associated with the prior art integrated voice data workstations, the prior art terminals have failed to address the more recent demands of industry in operating with low power consumption and providing an extremely small desk footprint for such systems. In this regard, due to the ever increasing high cost of office space, usable desk space remaining after installation of telephone and processing equipment has become a primary concern in the overall determination of purchasing and using such communication and processing equipment. Further, there exists a strong desire to replace various separate devices, such as a telephone and computer with a single piece of equipment capable of multiple functions.

Thus, there exists a substantial need in the art for a relatively low cost workstation which possesses an extremely small desk footprint, integrates voice and data communications, possesses conventional processing capabilities heretofore associated only with mini and personal computers, and provides a multi-tasking personal communications gateway to industry standard networks, mainframe and mini-computers for voice, image and text processing.

SUMMARY OF THE PRESENT INVENTION

The present invention specifically addresses and alleviates the above-referenced deficiencies associated in the prior art. More particularly, the present invention comprises an integrated voice data workstation composed generally of a light emitting flat panel display, processor unit, keyboard and telephone communication set, which, through specific limited system architecture, mates the function of the processor with dedicated telephone communication without disruption of normal processor and communication operation.

The integrated voice data workstation of the present invention is specifically constructed to house the processor in a compact housing or platform configuration which cradles the telephone communication set. Preferably, the processor cradle or housing occupies a maximum desk footprint of approximately 10 inches square and is adapted to receive a conventional analog or digital telephone on its upper surface, thereby maintaining the remaining available desk space when installed at a maximum. To augment the extremely small footprint of the system, the integrated voice data workstation preferably utilizes a light emitting, flat panel display which is mounted on an articulated support arm which may be attached to the edge of the desk to dispose the display above the desk surface. In addition, an industry standard compatible keyboard is utilized to allow operational function, as currently utilized on conventional mainframe, minicomputer and personal computer systems.

The integrated voice data workstation of the present invention is additionally designed to utilize industry standard operating systems, such as MS-DOS, PC-DOS, and OS-2, support all major communication protocols, and interface with digital or analog telephone switch gear, as well as future integrated services digital network (ISDN) protocols which will enable standardized transmission of voice, text, services, picture and data communications.

In addition, the present invention specifically solves the major problem with designs of prior art personal computers and prior art integrated voice data workstations which are substantially inept in allowing for multiple communication devices to coexist and operate concurrently with each other. This is accomplished in the present invention by virtue of incorporating a co-processor with the central processing unit which allow additional hardware interrupts and an additional DMA channel, such that additional communication requirements can be handled without interrupting other processes or programs running on the main processor. By use of the co-processor, direct communication is established between time sensitive communication devices and the processor which totally bypasses the operating system of the processor and allows the communication system to operate at its peak efficiency while additionally allowing the processor to operate at its peak efficiency without any degradation to other programs or other tasks assigned to the processor.

DESCRIPTION OF THE DRAWINGS

These as well as other features of the present invention will become more apparent upon reference to the drawings wherein:

FIG. 4 is a table of hardware interrupt requests and priority reassignments utilized in the coprocessor of the voice data workstation to enable concurrent non-disruptive processing and communication operation.

DETAILED DESCRIPTION OF THE PREFERRED EMBODIMENT

Figure 1:
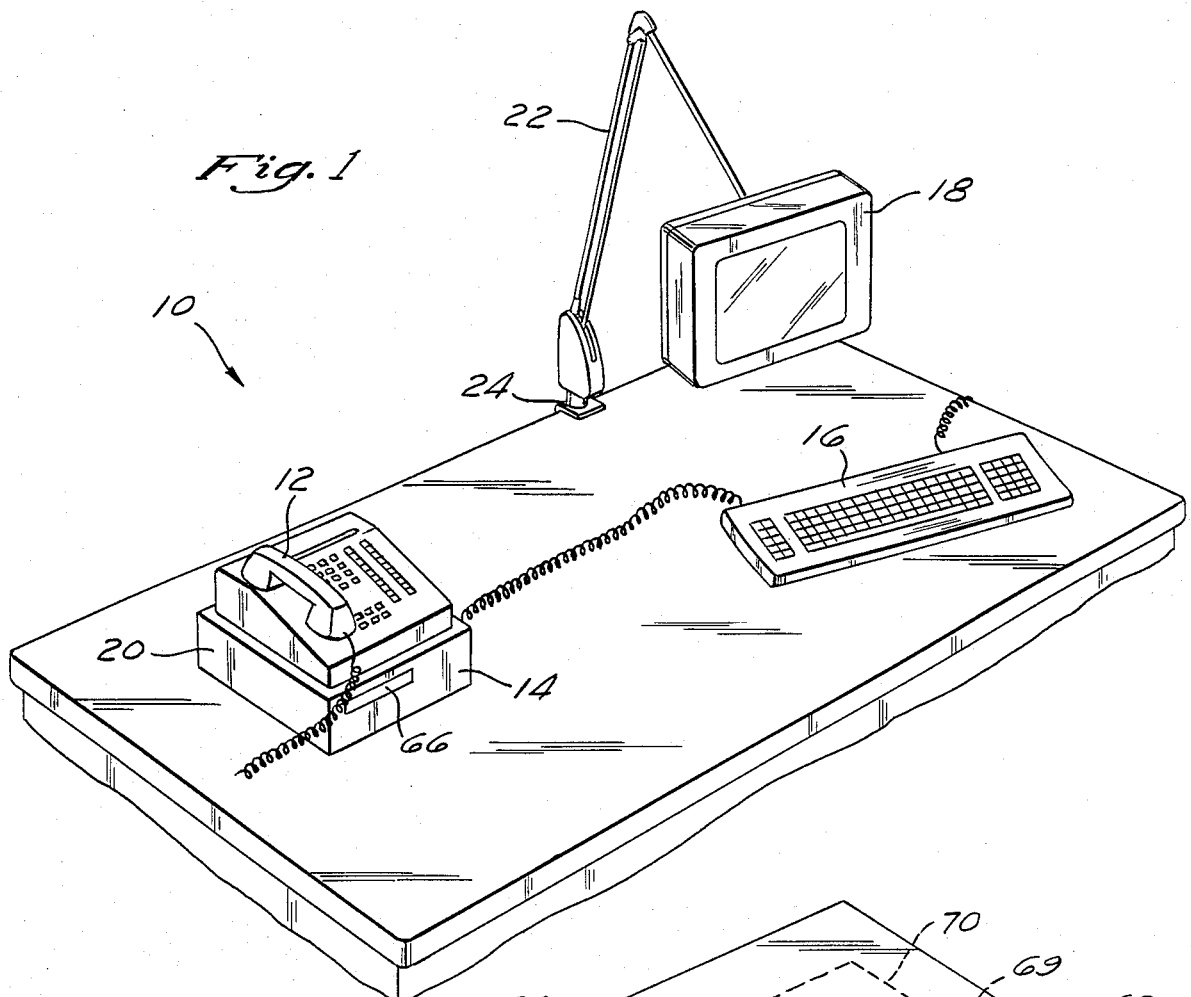
FIG. 1 is a perspective view of the integrated voice data workstation of the present invention disposed upon a desk surface.

Referring to FIG. 1, there is shown the integrated voice data workstation 10 of the present invention composed generally of a digital and/or analog telephone communication set 12, processing and computing platform 14, keyboard 16, and display 18 which are interconnected via conventional cable connectors (not shown) extending between the communication set 12, keyboard 16, and flat panel display 18 to the processing and computing platform 14. Although not shown for simplicity, conventional pointing devices, i.e. a mouse may be utilized with the workstation 10 if desired.

The processing and computing platform 14 is preferably formed to have an extremely small desk footprint of approximately 10 inches by 10 inches, and a vertical height of approximately 3 inches so as to minimize space requirements. In addition, the upper surface 20 of the platform 14 is specifically sized and configured to serve as a support platform or cradle for the telephone communication set 12. As will be recognized, by cradling the telephone communication set 12 upon the computing platform 14, the combined computing platform and telephone communication set 12 occupies substantially the same footprint as that previously associated solely with the telephone communication set.

In the preferred embodiment, the display 18 is implemented as a light emitting flat panel display which is mounted upon an articulated arm 22, which may be affixed by a base or clamp 24 to the edge of the desk support surface. As such, the flat panel display 18 may be disposed above the desk support surface so as not to occupy space thereon. Although a variety of displays 18 are contemplated herein, such as conventional CRTs, LCDs, electroluminescent displays (ELD) and plasma displays, in the preferred embodiment the flat panel display 18 comprises a Fujitsu FTF8050HFUG, 640×400 monochrome display panel. However, it is additionally contemplated that future color display flat panels may be substituted therefor. In addition, in the preferred embodiment the flat panel display 18 is implemented to include an integral power supply, thereby obviating the need for a separate power supply to be disposed within the processing and computing platform 14.

The keyboard 16 is preferably implemented as an IBM AT compatible keyboard or conventional 101 or 122 key keyboard, however, other alternative keyboards are contemplated herein. The keyboard 16 communicates with the processing and computing platform 14 via a conventional keyboard interface and cable to be discussed in more detail infra.

Figure 3:
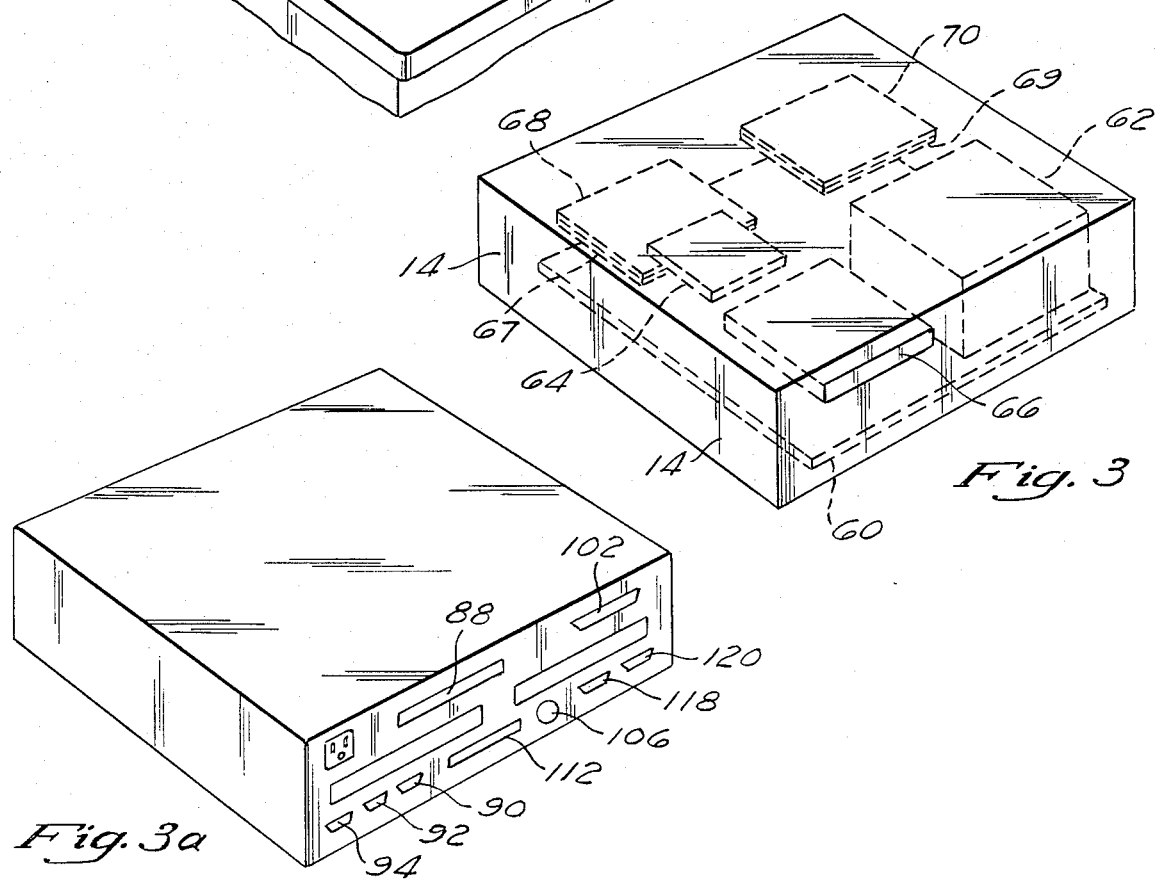
FIG. 3 is a front perspective view of the spatial relationship of the components of the computing platform of the present invention.
Figure 3A:
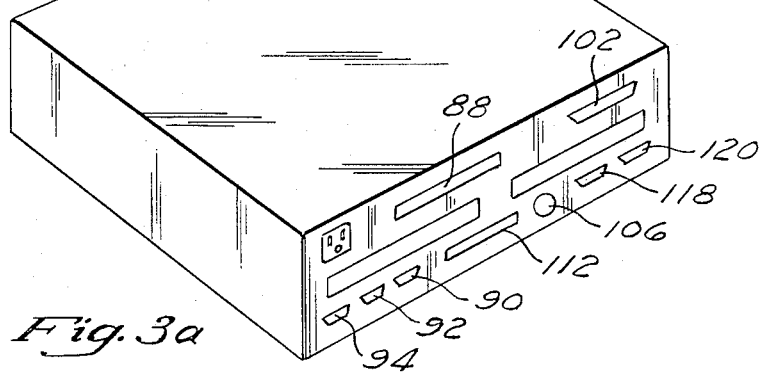
FIG. 3a is a rear perspective view of the computing platform of FIG. 3.
Figure 2:
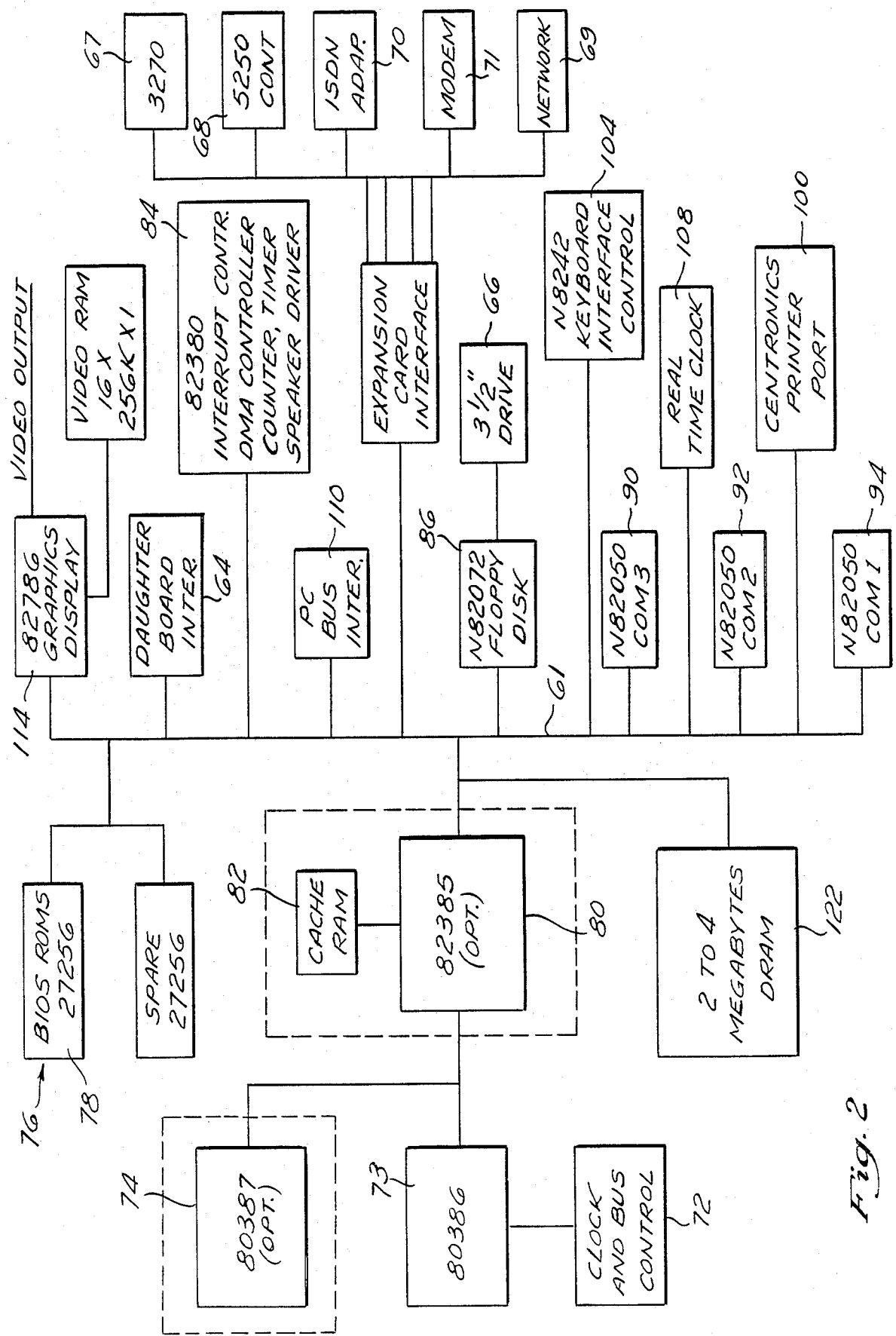
FIG. 2 is a electrical flow chart of the computing platform utilized in the central processor of the voice data workstation of the present invention.

Referring more particularly to FIGS. 2, 3 and 3a, the specific limited architecture of the processing and computing platform 14 may be described. Basically the computing platform 14 houses an Intel 80386 based computer or processor which is capable of running in a protected mode conventional operating system such as Microsoft (TM) windows-386, thereby enabling multiple Intel 8086 type computer capability. The processing and computer platform 16 houses a motherboard 60, power supply 62, a graphics display daughterboard 64, data memory system 66, and up to four or five optional expansion cards or boards 67, 68, 69 70 and 71. To allow diversity in meeting the specific needs of applications, the optional expansion cards 67 through 71 comprise a conventional mainframe communication card 67 such as an IBM or DCA 3270 controller card; a conventional mini-computer controller card 68 such as an IBM or DCA 5250 controller card; a network controller card 69 such as a Gateway Communications 82586 Ethernet controller card; an ISDN adapter card 70 such as an Intel or Seimens 29C53 ISDN "S" interface controller card; and a modem card 71 such as a Texas Instrument or Hayes International dual 300/1200/2400 BAUD modem card.

So as to maintain overall size to a minimum, the motherboard 60 is disposed in a horizontal plane adjacent the lower surface of the processing and computing platform 14 with the daughterboard 64 being hardwired thereto and disposed vertically above the motherboard 60 in a parallel plane. The expansion cards 67 through 71 are additionally disposed in a horizontal plane adjacent the rear of the platform 14 preferably coplanar with the plane of the daughterboard 64. As is well known, the expansion cards 67 through 71 each include conventional edge or pin connectors (not shown) which electrically connect the expansion cards 67 through 71 to the motherboard 60 via a common bus 61.

In the preferred embodiment, the power supply 62 is disposed in the front portion of the platform 14 at an elevation above the motherboard 60, and is preferably implemented as a Boschert 75XXX power supply which delivers 20 amps of current at 5 volts, 1 amp of current at 12 volts, and 0.25 amps of current at −12 volts. Additionally, the power supply is preferably limited in size to approximately 2 inches by 5 inches by 5 inches. The data storage mechanism 66 is preferably implemented as a conventional 3½ inch floppy disk drive which is positioned adjacent to the power supply 62 and disposed above the daughterboard 64. As best shown in FIG. 3, the disk drive 66 is accessible from the front panel of the processing and computer platform 14.

As shown in FIG. 2, the motherboard 60, which is formed using conventional surface mount components and/or through-hole mount devices, is provided with a processor 73 which is preferably implemented as an Intel 80386 processor having a conventional clock and bus controller 72. In the preferred embodiment, an optional math coprocessor 74 having conventional control logic is provided which is preferably implemented as an Intel 80387 processor. Preferably, four JEDEC EPROM sites 76 are provided on the motherboard 60 with two of the sockets from the sites being used by a Phoenix BIOS ROMs 78 and the remaining two sockets being available for the system expansion.

An optional Cache controller 80 is preferably provided including a Cache RAM 82 and associated logic. The controller 80 is preferably implemented as an Intel 82385 while the Cache RAM 82 preferably comprises a 32 KB RAM. A co-processor 84, preferably implemented as an Intel 82380 co-processor, is utilized to provide interrupt control, DMA counter, timer, and speaker drivers. As will be explained in more detail infra, the use of the co-processor 84 establishes a direct communication between a time sensitive communication device and the processor 70, thus allowing a complete bypass of the operating system of the processor 73 and allowing the communication device to operate at peak BAUD rates without degredation of programs or other tasks assigned to the processor 73.

The floppy disk drive 66 is controlled by a conventional disk controller 86 upon the motherboard 60 which is preferably implemented as an Intel N82072 disk controller. Preferably a connector 88 (shown in FIG. 3a) is additionally provided at the rear panel of the platform 14 to allow an expansion drive to be utilized.

Three serial communication ports 90, 92, and 94 are provided on the rear panel of the platform 14 (as shown in FIG. 3a) which are implemented by utilizing an Intel N82050 serial interface chip. This particular interface comprises AT-compatible serial ports having a maximum BAUD rate of 115,200 BAUD. A latch, a buffer, and a PAL is used to implement a configurable PC-compatible Centronics printer port 100 with a conventional ribbon cable (not shown) leading from the motherboard 60 to the printer connector 102 located on the rear panel of the platform 14. A keyboard interface 104 is additionally provided on the motherboard 60 which is preferably implemented as either an N8242 or N8742 interface. As will be recognized, the N8242 interface is used when Phoenix Technologies AT Code Revision 2.5 is desired to be implemented thereon, while the N8742 interface is used in applications requiring custom firmware keyboards. A keyboard connector port 106 is provided on the rear panel of the platform 14 to facilitate connection of the keyboard 16 to the keyboard interface 104.

A real time clock 108 is utilized to provide a time of day clock and includes a battery backup, as is conventional. Additionally, a PAL is utilized to provide an 8 MHz PC-AT expansion bus 110 having an associated bus connector 112 disposed upon the rear panel of the platform 14 to facilitate use of conventional disk drive expansion systems such as those manufactured by Fortron of Fremont, Calif. A graphic interface 114 is provided on the daughterboard 64 which comprises extensions of the internal bus 61 of the system. Preferably the graphic interface 114 is implemented as an Intel 82786 graphics display having 512 KB of DRAM. Video output signals pass back and forth from the motherboard 60 through cable connectors 118 and 120 mounted on the rear panel of the platform 14 with the connector 118 being used for the flat panel display 18 and the other connector 120 being used to drive an external video monitor if desired. An interface 122 is additionally provided on the motherboard 60 to provide for 2 MB of 100 DRAM. Preferably this interface is implemented as a 256K by 8 SIMM module which permits expansion to 4 MB.

As previously mentioned, the system architecture of the integrated voice data workstation 10 of the present invention contemplates up to four of the expansion cards 67 through 71 to be utilized in the workstation 10. Each of the expansion cards 68 through 71 comprise conventional card structures such as a mainframe communication card 67, minicomputer communication card 68, network card 69, ISDN adaptor card 70 and modem card 71, which communicate with the daughterboard 64 via the common bus 61. As opposed to conventional peripheral card constructions, however, the expansion cards 67 through 71 and common bus 61 are modified to include additional interrupt lines and an additional DMA channel or line. The use of the additional interrupt lines and DMA channel permits the expansion card 67 through 71 to be controlled by the coprocessor 84 such that when a request is made by any one of the controller cards 67 through 71, the coprocessor 84 will recognize the same as an immediate hardware interrupt which will cause the central processor 73 to serve the immediate requirements of the expansion card 67 through 71 irrespective of other time requests being made to the central processor 73.

In this regard, the coprocessor 84 in the preferred embodiment comprises an Intel 82380 coprocessor which includes twenty-three interrupt request services instead of the conventional seven interrupt request services associated with more conventional processors such as the Intel 8259A. In addition, each of the interrupt request inputs (IRQs) can be individually programmed with its own interrupt vector, allowing more flexibility in interrupt vector mapping than that conventionally available in other processors.

The details of these additional interrupts is illustrated in FIG. 4 wherein the interrupts IRQ 1–23 are illustrated. As shown, the interrupts IRQ 0 through IRQ 15 comprise conventional hardward interrupts having specific hardware assignments utilized for conventional IBM PC type computers; with IRQ 0 through IRQ 7 being assigned conventional hardware designations for all eight bit bus IBM PC type computers, and interrupts IRQ 8 through IRQ 15 being assigned conventional hardware designation for all 16 bit bus IBM PC type computers. As opposed to more conventional coprocessors, the particular coprocessor 84 utilized in the present invention additionally includes eight additional interrupts, IRQ 16 through IRQ 23, which are available for additional hardware designations. As is well known, interrupts IRQ 0 through IRQ 15 are preassigned by standard bios and operating systems. However, the additional interrupts IRQ 16 through IRQ 23 in the preferred embodiment are assigned to the expansion cards 67 through 71. In this regard, this assignment can be done arbitrarily and as indicated in FIG. 4, is preferably assigned such that interrupts IRQ 16 and IRQ 17 are designated for the modem expansion card 71; interrupt IRQ 18 is designated for the ISDN adaptor card 70; interrupt IRQ 19 is designated for the mainframe communication expansion card 67; interrupt IRQ 20 is designated for the minicomputer communication expansion card 68; interrupt IRQ 21 is designated for a facsimile interrupt; interrupt IRQ 22 is designated for the network expansion card 69; and interrupt IRQ 23 is designated for a digital PBX communication card. As such, each of the additional interrupts IRQ 16 through IRQ 23 may be utilized as a specific hardware interrupt to the coprocessor 84. In addition, the coprocessor 84 includes the ability for reassigning the priority of each of the interrupts IRQ 0 through IRQ 23 to a new hierarchy.

In the preferred embodiment, the priority of the interrupts IRQ 0 through IRQ 23 is modified such as that indicated in FIG. 4, such that the time sensitive communication devices comprising the expansion cards 67 through 71 designated by interrupts IRQ 16 through IRQ 23 are given higher interrupt priority than interrupts IRQ 1 through IRQ 15. The net result of the use of the additional interrupts IRQ 16 through IRQ 23, as well as the reassignment of the new priority for all of the interrupts, IRQ 0 through IRQ 23, is that the central processor 73, upon receipt of interrupts via the coprocessor 84, is able to immediately service the expansion cards 67 through 71 with a total bypass of the operating system being utilized on the central processor 70. As such, when any of the devices attached to the expansion card 67 through 71 or, more particularly, the interrupt lines IRQ 16 through IRQ 23 request servicing, that request will be honored by the central processor 73 prior to any other request made through interrupts IRQ 1 through IRQ 15. As such, when the time sensitive expansion cards 67 through 71 request servicing, the system insures an immediate response from the central processor 73 to the cards 67 through 71 which response is facilitated by the coprocessor 84 and processor 73 which are independent of the operating system or software that is running upon the central processing unit 73.

In view of each of the expansion cards 67 through 71 having its own interrupt line IRQ 16 through IRQ 23, respectively, each of the expansion cards 67 through 71 may be preset when installed upon the workstation 10, utilizing conventional hardwire technology and/or dip switch settings. However, in all instances, the expansion cards 67 through 71 provide hardware interrupts which, with the specific system architecture, isolates the operating system running on the central processor 73 upon a service request made by any of the expansion cards 67 through 71 to allow the time sensitive communication programs utilized on the expansion cards 67 through 71 to control the system and their requests and usage of central processor time. As such, the operating system of the work station 10 or its applications will not interfere with any communication device. Similarly, when no request is made for servicing by the expansion card 67 through 71, the processor 73 is controlled in a conventional manner by the operating system to run desired tasks of the central processor 73 without interference from the communication devices attached to the expansion cards 67 through 71.

As previously described, the expansion cards 67 through 71 are further modified to include an additional DMA (direct memory access) channel. In this regard DMA refers to the proces of transferring data bytes from one memory location to another without the transfer process being dependent upon the main central processing unit and the sequence of program instructions. The DMA controller temporarily borrows the main bus 61, i.e. the address bus, data bus and control lines, from the central processor and transfers data bytes directly from one port to a series of memory locations. In view of the data transfer being handled totally by hardware, the data transfer is much faster than that typically associated with microprocessor program instructions.

The DMA controller of the INTEL 82380 coprocessor 84 is capable of transferring data between any combination of memory locations with any combination (8, 16, 32 bits) of data path widths. Bus bandwidth is optimized through the use of an internal temporary register which can disassemble or assemble data to or from either an aligned or non-aligned destination or source. More particularly, the 82380 coprocessor 84 includes eight channels of DMA, unlike normal IBM PC and AT designs which have only seven DMA channels. Each channel operates independently of the others. Within the operation of the individual channels, there are many different modes of data transfers available. There are 24 general status and command registers in the 82380 DMA controller of the coprocessor 84. Through these registers, any of the channels may be programmed into any possible modes of operation. The operating modes of any channel are independent of the operation of other channels. Each of the channels have three programmable registers which determine the location and amount of data to be transfered. These registers comprise a byte count register which represents the number of bytes to be transfered; a requester register which facilitates the address of memory or peripherals which are requesting DMA service and a target register which facilitates the address of peripheral or memory which will be accessed. The DMA controller of the coprocessor 84 transfers data in three modes, i.e. a single buffer mode, a buffer auto-initilize mode and a buffer chaining mode.

In the single buffer mode, the DMA controller of the coprocessor 84 is programmed to transfer one particular block of data. Successive transfers then require reprogramming of the DMA channel. Single buffer transfers are useful in systems where it is known at the time the transfer begins what quantity of data is to be transferred and there is a continguous block of data area available. The buffer auto-initialize mode allows the same data area to be used for successive DMA transfers without having to reprogram the DMA channel. The buffer chaining mode allows a program to specify a list of buffer transfers to be executed. As such the DMA controller of the coprocessor 84 through interrupt routines may be reprogrammed from the buffer transfer list. The DMA channel is reprogrammed for a new buffer before the current buffer transfer is completed. This pipelining of the channel programming process allows the system to allocate noncontiguous blocks of data storage space and transfer all of the data with one DMA process. The buffers that make up the chain do not have to be in contiguous locations. Additionally, DMA channel priority can be fixed or rotating upon the coprocessor. Fixed priority allows a priority of DMA channels to be defined based upon the hardware or other fixed parameters of the system whereas rotating priority may be used to provide peripherals access to the bus on a shared basis. Similarly with fixed priority, the DMA channels may be set to have current lowest priority thereby allowing the user to reset or manually rotate the priority schedule without reprogramming the command registers.

In the present invention, the programmable nature of the DMA controller interrupt and DMA requests of the coprocessor 84 is utilized to optimize the usage of the bus and maximize data throughput. Thus, basically the best features of both a system bus and a local bus are obtained. Similarly in the present invention, the DMA channels are preassigned to individual expansion cards 67 through 71 along with hardware interrupts to balance the performance of the system when hosting time sensitive communication devices. Further, by use of the coprocessor 84 the system is compatible with older IBM bus structures while implementing features of newer bus designs.

With the structure defined, the operation of the integrated voice/data workstation 10 of the present invention may be described. In operation, the central processor 73 operates to process data received via the internal bus 61 under the control of the particular operating system utilized in the workstation 10. So long as the service request is not received from the expansion cards 67 through 71, multi-tasking processing is effectuated by the central processor 73 via the operating system in a conventional manner. However, upon a service request being made by any of the devices attached to the expansion cards 67 through 71, the request signal received upon the internal bus 61 by the coprocessor 84 causes an interrupt signal to the central processor 73 such that the particular expansion card 67 through 71 will be serviced exclusively by the central processor 73. In this regard, the interrupt signal generated upon request of any of the expansion cards 67 through 71 bypasses the operating system of the processor 73 and allows the processor 70 to immediately service the particular expansion card 67 through 71. Upon completion of the request made by a respective one of the expansion cards 67 through 71, the processor 73 will immediately return back to the control of the operating system to permit desired multi-tasking function. As such, it will be recognized that through specific limited system architecture, concurrent non-disruptive processing and communication operation is achieved by use of the coprocessor 84 which bypasses the operating system of the central processing unit 73 to establish direct communication between communication devices attached to the expansion cards 67 through 71 and the processor 73 and thereby allows the processor 73 to operate at peak level efficiencies without degredation to other program tasks.

The benefits of the integrated voice/data workstation 10 of the present invention can be rapidly appreciated by recognizing that the workstation 10 facilitates a single device to be utilized for concurrent communication with mainframe and minicomputers and computer networks as well as permit data and voice communication with existing systems. As such a myriad of separate data terminals and voice communication systems can be replaced by a single portable voice/data work station which possesses an extremely small foot print.

For purposes of description, certain components and structures have been defined herein. However, those skilled in the art will recognize that various modifications to the same can be made without departing from the spirit of the present invention and such modifications are clearly contemplated herein.

What is claimed is:

1. An integrated voice data workstation comprising:
   processor means for processing data;
   keyboard means for inputting data to said processor means;
   display means for displaying data to a user;
   communication means coupled to said processor means for sending and receiving telecommunications; and
   means for mating the function of said processor means with said communication means without disruption of the individual operation of said processor means and said communication means, said mating means comprising coprocessing means coupled between said processor means and said communication means for allowing operating of said communication means without interrupting programs running on said processor means.

2. The integrated voice data workstation of claim 1 wherein said coprocessing means includes multiple hardware interrupts assigned in a heirarchy to permit the processor means to serve the immediate requests of the communication means.

3. The integrated voice data workstation of claim 2 wherein said communication means comprises a telephone communication set.

4. The integrated voice data workstation of claim 2 wherein said communication means comprises:
   a telephone communication set;
   at least one of the following communication cards connected to said processor means:
   (a) a modem card;
   (b) an ISDN card;
   (c) a mainframe communication card;
   (d) a minicomputer communication card;
   (e) a network card; and
   (f) an ethernet card.

5. The integrated voice data workstation of claim 4 wherein said processor means comprises an INTEL 80386 processor.

6. The integrated voice data workstation of claim 5 wherein said coprocessing means comprises an INTEL 82380 coprocessor.

7. The integrated voice data workstation of claim 6 wherein said display means comprises a flat panel display.

8. The integrated voice data workstation of claim 7 wherein said processor means and said coprocessing means are housed in a computing platform.

9. The integrated voice data workstation of claim 8 wherein said computing platform is formed to support said telephone communication set thereupon.

10. An integrated voice data workstation comprising:
processor means for processing data;
keyboard means for inputting data to said processor means;
display means for displaying data to a user;
telephone communication means interfaced to said processor means for sending and receiving telecommunications;
operating system means for controlling the operation of said processor means; and
coprocessing means coupled between said processor means and said telephone communication means to recognize a hardware service request made by said telephone communication means and bypass said operating system means to facilitate said processing means to immediately service said service request from said telephone communication means.

11. The integrated voice data workstation of claim 10 wherein said telephone communication means comprises a telephone communication set.

12. The integrated voice data workstation of claim 11 wherein said telephone communication means additionally comprises a modem.

13. The integrated voice data workstation of claim 12 wherein said telephone communication means additionally comprises an ISDN communication card.

14. The integrated voice data workstation of claim 13 wherein said telephone communication means additionally comprises a network card.

15. The integrated voice data workstation of claim 14 wherein said telephone communication means additionally comprises an ethernet card.

16. The integrated voice data workstation of claim 15 wherein said telephone communication means additionally comprises a mainframe communication card.

17. The integrated voice data workstation of claim 15 wherein said telephone communication set comprises a minicomputer communication card.

18. The integrated voice data workstation of claim 15 wherein said processor means comprises an INTEL 80386 processor.

19. The integrated voice data workstation of claim 18 wherein said coprocessing means comprises an INTEL 82380 coprocessor.

20. The integrated voice data workstation of claim 19 wherein said display means comprises a flat panel display.

21. The integrated voice data workstation of claim 20 wherein said processor means and said coprocessing means is housed in a computing platform.

22. The integrated voice data workstation of claim 21 wherein said computing platform is formed to support said telephone communication set thereupon.

* * * * *